(12) United States Patent
Breese et al.

(10) Patent No.: US 9,550,930 B2
(45) Date of Patent: *Jan. 24, 2017

(54) THERMAL LAMINATION ADHESIVE COATINGS FOR USE ON SUBSTRATES

(71) Applicant: Michelman, Inc., Cincinnati, OH (US)

(72) Inventors: D. Ryan Breese, Loveland, OH (US); Robin Cooper, Attert (BE); Krist Vanderstiggel, Veerle Laakdal (BE); Edward R. Gay, Cincinnati, OH (US); Richard Michelman, Cincinnati, OH (US)

(73) Assignee: Michelman, Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/722,483

(22) Filed: May 27, 2015

(65) Prior Publication Data

US 2015/0344754 A1  Dec. 3, 2015

Related U.S. Application Data

(60) Provisional application No. 62/004,956, filed on May 30, 2014.

(51) Int. Cl.

| | | |
|---|---|---|
| *C08K 3/28* | (2006.01) | |
| *C08L 23/08* | (2006.01) | |
| *C08L 75/04* | (2006.01) | |
| *C09J 133/02* | (2006.01) | |
| *C09J 175/04* | (2006.01) | |
| *C09J 177/06* | (2006.01) | |
| *C09J 177/08* | (2006.01) | |
| *B32B 7/12* | (2006.01) | |
| *B32B 27/08* | (2006.01) | |
| *B32B 27/36* | (2006.01) | |
| *B32B 37/12* | (2006.01) | |
| *B32B 27/32* | (2006.01) | |
| *B32B 37/24* | (2006.01) | |
| *B32B 37/06* | (2006.01) | |

(52) U.S. Cl.
CPC ............... *C09J 177/06* (2013.01); *B32B 7/12* (2013.01); *B32B 27/08* (2013.01); *B32B 27/32* (2013.01); *B32B 27/36* (2013.01); *B32B 37/12* (2013.01); *B32B 37/1284* (2013.01); *B32B 37/24* (2013.01); *C08K 3/28* (2013.01); *C08L 23/0869* (2013.01); *C08L 75/04* (2013.01); *C09J 133/02* (2013.01); *C09J 175/04* (2013.01); *C09J 177/08* (2013.01); *B32B 37/06* (2013.01); *B32B 2037/243* (2013.01); *B32B 2255/10* (2013.01); *B32B 2255/26* (2013.01); *B32B 2307/518* (2013.01); *B32B 2553/00* (2013.01); *C09J 2433/003* (2013.01); *C09J 2475/003* (2013.01); *C09J 2477/003* (2013.01); *Y10T 428/24802* (2015.01); *Y10T 428/31551* (2015.04); *Y10T 428/31725* (2015.04)

(58) Field of Classification Search
CPC ....... C09J 177/06; C09J 133/02; C09J 175/04; C09J 2433/003; C09J 2475/003; C09J 177/08; C09J 2477/003; C08K 3/28; C08L 23/0869; C08L 75/04; B32B 7/12; B32B 27/08; B32B 27/36; B32B 37/06; B32B 37/12; B32B 2553/00; B32B 27/32; B32B 2255/10; B32B 2255/26; B32B 2307/518; B32B 37/1284; B32B 37/24; B32B 2037/243; Y10T 428/24802; Y10T 428/31551; Y10T 428/31725
See application file for complete search history.

(56) References Cited

U.S. PATENT DOCUMENTS

| | | | |
|---|---|---|---|
| 3,373,223 A | 3/1968 | Armstrong | |
| 3,582,507 A | 6/1971 | Peerman | |
| 3,843,576 A | 10/1974 | Parkinson | |
| 5,095,058 A * | 3/1992 | Smith | ........................ C08J 3/03 523/326 |
| 5,206,279 A | 4/1993 | Rowland et al. | |
| 5,387,635 A | 2/1995 | Rowland et al. | |
| 5,539,021 A | 7/1996 | Pate et al. | |
| 5,574,091 A | 11/1996 | Walther et al. | |

(Continued)

FOREIGN PATENT DOCUMENTS

| | | |
|---|---|---|
| EP | 0 969 068 A1 | 1/2000 |
| EP | 2 716 714 A1 | 4/2014 |
| JP | 2009 091426 A | 4/2009 |
| WO | 87/00190 A1 | 1/1987 |
| WO | 01/88039 A1 | 11/2001 |
| WO | 2006/102581 A1 | 9/2006 |
| WO | 2010104626 A1 | 9/2010 |
| WO | WO 2012/161110  * | 11/2012 |
| WO | 2014044322 A1 | 3/2014 |

OTHER PUBLICATIONS

International Search Report and Written Opinion dated Jul. 2, 2015 pertaining to International Application No. PCT/US2015/032800.

(Continued)

*Primary Examiner* — Patrick Niland
(74) *Attorney, Agent, or Firm* — Dinsmore & Shohl LLP

(57) ABSTRACT

Lamination adhesives including an aqueous dispersion having a mixture of a polyamide and an ethylene acrylic acid copolymer are provided for use on a variety of substrates. In various embodiments, the aqueous dispersion is substantially free of plasticizers and non-aqueous organic solvents. Also provided is a method of forming a laminate adhesion between two substrates. The disclosure also describes a laminate structure comprising first and second substrates laminated together by the lamination adhesive, the lamination adhesive including a mixture of a polyamide and a copolymer of ethylene and acrylic acid.

27 Claims, No Drawings

(56) References Cited

U.S. PATENT DOCUMENTS

| | | |
|---|---|---|
| 5,688,842 A | 11/1997 | Pate, III et al. |
| 5,798,410 A | 8/1998 | Walther et al. |
| 6,271,276 B1 | 8/2001 | Gribble et al. |
| 6,512,024 B1 | 1/2003 | Lundgard et al. |
| 6,521,696 B2 | 2/2003 | Oates et al. |
| 6,767,956 B2 | 7/2004 | Choudhery et al. |
| 6,790,514 B1 | 9/2004 | Almog et al. |
| 7,361,694 B2 | 4/2008 | Strandburg et al. |
| 7,439,276 B2 | 10/2008 | Strandburg et al. |
| 7,456,228 B2 | 11/2008 | Strandburg et al. |
| 7,470,736 B2 | 12/2008 | Cooper |
| 7,528,080 B2 | 5/2009 | Prieto et al. |
| 7,763,676 B2 | 7/2010 | Moncla et al. |
| 7,803,865 B2 | 9/2010 | Moncla et al. |
| 7,812,062 B2 | 10/2010 | Strandburg et al. |
| 7,935,755 B2 | 5/2011 | Moncla et al. |
| 7,947,776 B2 | 5/2011 | Moncla et al. |
| 8,053,503 B2 | 11/2011 | Moncla et al. |
| 8,063,128 B2 | 11/2011 | Moncla et al. |
| 8,158,711 B2 | 4/2012 | Moncla et al. |
| 8,163,837 B2 | 4/2012 | Moncla et al. |
| 8,193,275 B2 | 6/2012 | Moncla et al. |
| 8,455,578 B2 | 6/2013 | Dinescu et al. |
| 8,957,150 B2 * | 2/2015 | Sakata ................ C08J 3/03 524/501 |
| 2008/0275151 A1 | 11/2008 | Strandburg et al. |
| 2010/0137501 A1 | 6/2010 | Moncla et al. |
| 2011/0076486 A1 | 3/2011 | McGee et al. |
| 2011/0117359 A1 | 5/2011 | De Santos et al. |
| 2011/0171481 A1 | 7/2011 | Kainz et al. |
| 2011/0195263 A1 | 8/2011 | Malotky et al. |
| 2012/0029132 A1 | 2/2012 | Moncla et al. |
| 2014/0127498 A1 | 5/2014 | Ibanez |
| 2014/0170509 A1 * | 6/2014 | Nagata ............ H01M 2/0287 429/407 |
| 2015/0344729 A1 * | 12/2015 | Breese ............ C09D 177/00 428/336 |
| 2015/0346621 A1 * | 12/2015 | Breese ............ G03G 7/0046 428/336 |

OTHER PUBLICATIONS

International Search Report and Written Opinion dated Jul. 2, 2015 pertaining to International Application No. PCT/US2015/032909.
International Search Report and Written Opinion dated Sep. 1, 2015 pertaining to International Application No. PCT/US2015/032836.

* cited by examiner

THERMAL LAMINATION ADHESIVE COATINGS FOR USE ON SUBSTRATES

CROSS-REFERENCE TO RELATED APPLICATIONS

This application claims the benefit of U.S. patent application Ser. No. 62/004,956, filed May 30, 2014, which is hereby incorporated by reference in its entirety.

TECHNICAL FIELD

Embodiments described herein relate generally to coatings for use on a variety of substrates, and more particularly, to coatings that include an aqueous dispersion of polyamide and a copolymer of ethylene and acrylic acid polyamide dispersion. Such coatings may be used as thermal lamination adhesives for substrates used in packaging applications.

BACKGROUND

Polymeric substrates may be laminated to one another with a lamination adhesive. For example, films may be laminated together with a lamination adhesive and used in packaging applications. Solvent-based lamination adhesives have been widely used, but due to their high VOC content, alternative, solventless adhesives are becoming more environmentally desirable for use. However, solventless lamination adhesives typically require three to five days in which to cure and form a strong bond. While water-based laminating adhesives have been developed, they do not currently provide strong lamination bond strength.

In addition, use of lamination adhesives often requires that the substrates be coated with a primer first to enhance lamination strength. However, conventional primers tend to exhibit unacceptably low lamination bond strength when a printed substrate is laminated to another substrate. Thus, there is also a need in the art for a coating which can be applied as a laminating adhesive to substrates which are printed with high speed digital presses and which provides improved bond strength when used to laminate polymeric substrates.

Accordingly, there is a need in the art for a coating which can be used to provide enhanced laminating bond strength to substrates.

SUMMARY

Embodiments of the invention meet those needs by providing a coating comprising an aqueous dispersion of mixture a polyamide and an ethylene acrylic acid copolymer. The coating may be used on a variety of substrates including polymers, metal and paper. The coating may be used as a water-based thermal lamination adhesive which provides high bond strength to laminated substrates.

According to one embodiment of the invention, a lamination adhesive for use on substrates is provided. The lamination adhesive includes an aqueous dispersion. The aqueous dispersion includes a mixture of polyamide and a copolymer of ethylene and acrylic acid. The aqueous dispersion is substantially free of non-aqueous plasticizers and organic solvents.

According to a further embodiment of the invention, a method of forming a laminate adhesion between two substrates is provided. The method includes applying a lamination adhesive coating to at least a portion of a surface of a first substrate, applying a surface of a second substrate to the lamination adhesive coating, and heating the first substrate, the lamination adhesive coating, and the second substrate to achieve laminate adhesion between the first and second substrate. The lamination adhesive coating includes an aqueous dispersion comprising from about 15% to about 40% by weight solids and the balance water and ammonia. The solids comprise a mixture of polyamide and a copolymer of ethylene and acrylic acid.

In yet another embodiment, a laminate structure is provided. The laminate structure includes a first and second substrate. The first substrate is laminated to the second substrate with a lamination adhesive. The lamination adhesive comprises a mixture of polyamide and a copolymer of ethylene and acrylic acid. The lamination adhesive is substantially free of non-aqueous plasticizers and organic solvents.

Accordingly, various embodiments are directed to a thermal lamination adhesive for substrates which include an aqueous dispersion of a polyamide and a copolymer of ethylene and acrylic acid. These and other features and advantages of the invention will become apparent from the following detailed description and the appended claims.

DETAILED DESCRIPTION

Reference will now be made in detail to various embodiments of thermal lamination adhesives that include an aqueous dispersion. The components of the lamination adhesive include an aqueous dispersion of polyamide and a copolymer of ethylene and acrylic acid. Such thermal lamination adhesive can be used with various substrates, including substrates which are primed and subsequently printed on using a digital printer. Embodiments of the lamination adhesive may provide advantages over prior solventless, solvent-based, or water-based adhesives. For example, various embodiments of the lamination adhesive do not require any hazardous co-catalysts to achieve crosslinking. Additionally, various embodiments of the lamination adhesive provide higher bond strength upon lamination. Furthermore, various embodiments of the lamination adhesive provide a method of laminating narrow web, small diameter substrate rolls with minimal cure time (in some embodiments no post curing is required) compared with other solventless, solvent-based, or water-based adhesives.

Unless otherwise indicated, the disclosure of any ranges in the specification and claims are to be understood as including the range itself and also anything subsumed therein, as well as endpoints.

In various embodiments, a lamination adhesive includes an aqueous dispersion including a mixture of a polyamide and a copolymer of ethylene and acrylic acid. As used herein, a "dispersion" refers to a finely divided solid or liquid in a continuous liquid medium. An aqueous dispersion is a dispersion in which the continuous liquid medium is water.

In some embodiments, the dispersion mixture may further include polyurethane. Various embodiments may also include ammonia or other neutralizers. The balance of the dispersion may be water. Various embodiments of the aqueous dispersion are substantially free of non-aqueous plasticizers and organic solvents. By "substantially free," we mean that less than 1 wt % of non-aqueous plasticizers and organic solvents are present.

The term "dispersion" as used herein with reference to various embodiments is intended to include emulsions of essentially liquid materials and dispersions of solid particles. According to various embodiments, the aqueous dispersion contains from about 5% to about 40% by weight solids. More preferably in certain embodiments, the aqueous dispersion contains from about 15% to about 30% by weight solids. The aqueous dispersion in various embodiments contains from about 60% to about 95% by weight water. In certain embodiments, the aqueous dispersion contains from about 70% to about 85% by weight water.

In various embodiments, the polyamide is present in an amount from about 35% to about 70% by weight based on the solids. In some embodiments, the polyamide is present in an amount from about 30% to about 50% by weight based on the solids. In embodiments including greater than about 70% polyamide, the dispersion may not be stable and the polyamide may not remain suitably dispersed in the mixture. In various embodiments, the polyamides are highly branched, low molecular weight polyamides based on fatty acids such as oleic acid. Commercially available polyamides suitable for use may include, by way of example and not limitation, Macromelt® 6239 (available from Henkel). The polyamides included in the aqueous dispersion may be hot melt adhesives.

According to various embodiments, the polyamide is an amine-terminated polyamide. In some embodiments, polyamides with other terminal functional groups, such as an acid group, may be used in the dispersion. In such embodiments, the use of a functional-terminated polyamide in the dispersion may result in improved bonding of the substrates upon lamination when compared to a dispersion including a "non-functional" polyamide. As used herein, a "non-functional" polyamide refers to a polyamide lacking a chemically reactive functional terminal group. Non-functional polyamides can include, for example, nylon 6,6 or nylon 12. In some embodiments, the use of a functional-terminated polyamide may further provide enhanced flexibility of the lamination adhesive coating when compared to a lamination adhesive coating including a non-functional polyamide.

As disclosed hereinabove, in some embodiments the lamination adhesive may also include polyurethane. In specific embodiments, the polyurethanes are aliphatic. The polyurethane may be present in an amount of greater than 0% to about 70% by weight based on the solids. In some embodiments, the polyurethane is present in an amount of greater than 40% to about 60% by weight based on the solids. Suitable polyurethanes for use include, by way of example and not limitation, Dispercoll® U56, U53, U54, and Neorez 605, commercially available from Bayer, which is in the form of an aqueous polyurethane dispersion. Without being bound by theory, the polyurethane lowers the heat seal temperature and adds adhesiveness to the aqueous dispersion.

In various embodiments, the ethylene acrylic acid copolymer is present in the dispersion in an amount from about 10% to about 30% by weight based on the solids. In some embodiments, the ethylene acrylic acid copolymer is present in an amount from about 10% to about 50% by weight based on the solids. In embodiments including greater than about 50% ethylene acrylic acid copolymer, the dispersion may not exhibit a suitable water resistance or bond strength once laminated into a flexible packaging structure. However, in embodiments including less than about 10% ethylene acrylic acid copolymer, the dispersion may become unstable and, in particular, the polyamide may not remain suitably dispersed. The copolymer may have a number average molecular weight of about 2,000 to about 180,000. In various embodiments, the copolymer includes from about 65% to about 90% by weight ethylene comonomers and from about 10% to about 35% acrylic acid comonomers. However, in some embodiments, the copolymer includes from about 10% to about 30% acrylic acid comonomers. In still other embodiments, the copolymer includes from about 15% to about 20% acrylic acid comonomers.

Without being bound by theory, it is believed that the ethylene acrylic acid copolymer acts as a polymeric surfactant to maintain the polyamide in dispersion. Conventionally, polyamides are difficult to disperse in water. However, in the embodiments described herein, the combination of ethylene acrylic acid copolymer with polyamide enables a stable water-based dispersion.

In some embodiments, the dispersion mixture may further include a crosslinker. In certain embodiments, the crosslinker is an isocyanate crosslinker. In still other embodiments, the dispersion mixture includes from about 1% to about 2% isocyanate cross linker. Without being bound by theory, the addition of an isocyanate crosslinker to the dispersion mixture acts to increase water resistance.

In additional embodiments, the lamination adhesive may also optionally contain one or more additives such as defoaming agents (e.g. Michelman DF016), thickening agents, and wetting agents, such as glycol, surfactants and/or alcohols.

According to some embodiments, the copolymer may be prepared as a dispersion by heating the solid ethylene acrylic acid copolymer with a water phase in a pressure reactor under elevated temperature (from about 75° C. to about 190° C.) and pressure (from about 300 psi to about 800 psi) in the presence of a base, such as ammonia. In some embodiments, ammonia is included in amounts of about 0.1% to 2.0% by weight. Ammonia, in either its anhydrous or aqueous form, can be added to neutralize part or all of the acidic portion of the ethylene acrylic acid copolymer. The base reacts with the acid groups on the copolymer, and upon melting, the copolymer forms a dispersion. Suitable ethylene acrylic acid dispersions for use include, by way of example and not limitation, Primacor® 5985 and 5990, commercially available from Dow Chemical Company.

In other embodiments, ethylene acrylic acid may be added to a reactor in a solid form and dispersed along with the polyamide. While various methods may be employed to form the dispersion, in various embodiments, melt-kneading is used. In some embodiments, a kneader, a Banbury mixer, a single-screw extruder, or a multi-screw extruder may be used. For example, a multi-screw extruder having two or more screws, to which a kneading block can be added at any position of the screws may be used.

In various embodiments, a twin screw extruder includes a base reservoir and an initial water reservoir, each of which includes a pump. Desired amounts of base and an initial amount of water are provided from the base reservoir and the water reservoir, respectively. In various embodiments, the base is ammonia. In some embodiments, the base and water are preheated.

Resin in the form of pellets is fed from a feeder to an inlet of the extruder, where the resin is melted or compounded. In some embodiments, the dispersing agent is added to the resin, while in other embodiments, the dispersing agent is provided separately to the twin screw extruder. In various embodiments, the "resin" is the polyamide and the "dispersing agent" is the ethylene acrylic acid copolymer described hereinabove. As an example, in various embodiments, pellets of ethylene acrylic acid copolymer and pellets of polyamide may be blended together before being fed into the extruder where they are melted and blended together.

The resin melt is then delivered to an emulsification zone of the extruder where the initial amount of water and base is added through an inlet. In some embodiments, the emulsified mixture is further diluted with additional water from the water reservoir in a dilution and cooling zone of the extruder.

In other embodiments, the polyamide, the ethylene acrylic acid copolymer dispersion, and optionally the polyurethane and crosslinker, are combined by a high shear mixing process at ambient conditions. In some embodiments, however, the high shear mixing process may be performed partially or completely under elevated temperature (from about 75° C. to about 190° C.) and pressure (from about 300 psi to about 800 psi).

In various embodiments, at ambient temperature the lamination adhesive coating has a Brookfield dispersion viscosity of less than about 200 cP when measured using a Brookfield #3 spindle and a rotational speed of about 60 rpm.

The resulting lamination adhesive coating is applied to a first substrate in any suitable manner, including the use of a laminating machine, gravure coating, roll coating, wire rod coating, flexographic printing, spray coating, screen printing, and the like. Substrates can include, by way of example and not limitation, cellulosic, polymeric, or metal based substrates. Suitable cellulosic substrates include paper and other non-woven substrates. Suitable metallic or glass coated substrates include aluminum foil, metallized polymeric films, metallized paper, and $AlO_x$ or $SiO_x$ coated polymeric films. Suitable polymeric substrates include, but are not limited to, polyesters such as polyethylene terephthalate, polylactic acid (PLC), and polyhydroxyalkanoates (PHA), polyolefins such as biaxially oriented polyethylene terepthalate (BOPET), biaxially oriented polypropylene (BOPP), polyethylene, and polyamides such as biaxially orientated polyamide, polyvinyl chloride. Other substrates may include, for example, fiber, wood, glass, nonwoven fabric, and the like. In some embodiments, such as where the substrate has a low surface energy (less than about 40 dynes/cm), the substrate surface may be treated with a flame treatment or corona discharge treatment prior to coating.

In some embodiments, the lamination adhesive coating is applied to a first substrate. In certain embodiments, the lamination adhesive may be applied at a coat weight of about 0.5 to 3.0 dry g/m². Subsequently, a second substrate may be applied to the lamination adhesive. The first substrate, lamination adhesive, and second substrate may be dried to form a laminate adhesion between the two substrates. Suitable methods of drying include, but are not limited to, the use of an oven or heated rollers of laminating machine. A suitable laminating machine includes, but is not limited to, a ChemInstruments hot roll laminator (Model HL-100). Other suitable methods of drying include hot air, radiant heat, or any other suitable means which provides a laminate adhesion between the two substrates. In various embodiments, the lamination adhesive coating is applied to the first substrate such that upon drying, the coating forms a laminate of from about 0.3 micron to about 5.0 microns in thickness. In some embodiments, the coating forms a laminate of about 1.0 to 3.0 microns in thickness. Other coating thicknesses may be employed. In various embodiments, the lamination adhesive is coated directly on the substrate. For example, the lamination adhesive is coated on the substrate without any intervening coatings or layers being applied between the lamination adhesive and the surface of the substrate.

It should be understood that various embodiments provide a single lamination adhesive that includes both polyamide and ethylene acrylic acid copolymer. Conventionally, ethylene acrylic acid copolymers and polyamide were provided in separate layers to obtain the functional advantages of each of the components. For example, ethylene acrylic acid copolymer exhibits good adhesion to ink, but by itself does not adhere well to some polymeric substrates. While polyamide exhibits good adhesion to a wide range of polymeric substrates, because of difficulties in forming a stable aqueous dispersion, it is conventionally dispersed in solvent, especially organic solvents, which can lead to environmental problems when the solvent evaporates. Alternatively, polyamide may be extruded onto the substrate as a film. However, the thickness of an extruded film (with or without additional coating layers, such as a coating including ethylene acrylic acid copolymer), will typically be several up to about 10 microns, which may be limiting in various flexible packaging implementations. For example, a thinner coating can reduce the total thickness of the flexible packaging, may reduce costs associated with manufacturing and shipping, and may enable other coatings to be employed to provide other advantages, such as puncture-resistance, without adversely affecting the flexibility of the packaging.

It should be appreciated that the lamination adhesive described above may be used in conjunction with primer coating. For example, after a primer has been applied to a substrate and dried, the primer coated polymer substrate may then be printed using a digital press and liquid toner/ink. The lamination adhesive may be applied to the primed/printed substrate surface prior to lamination to a second polymeric substrate. In various embodiments, when a primed and printed substrate is laminated to a second substrate, the bond strength is sufficient to cause the ink layer to fail cohesively, i.e., the bond strength between the primer and ink and the ink to the lamination adhesive is greater than the internal strength of the ink layer, such that the ink layer split and was observed on both substrates of the lamination.

In order that various embodiments may be more readily understood, reference is made to the following examples which are intended to illustrate various embodiments, but not limit the scope thereof.

Example 1

A biaxially oriented polyethylene terephthalate (BOPET) film having a thickness of 12 microns was primed using a primer coating at a coat weight of 0.3 dry gsm in accordance with embodiments described hereinabove, printed and then coated with a thermal lamination adhesive in accordance with an embodiment of the invention at a coat weight of 3.0 dry gsm. The primer coating included 15% by weight solids, and 70% Macromelt® polyamide (Henkel Corp., Conn.), and 30% Primacor® EAA (Dow Chemical Company, Mich.), by weight on a solids basis. The lamination adhesive included 48% by weight polyamide, 21% by weight ethylene acrylic acid copolymer, 29% by weight polyurethane, and 2% by weight isocyanate crosslinker. The lamination adhesive was coated by hand with meyer rods. The printed and coated film web was then thermally laminated to a blown low linear density polyethylene (LLDPE) film having a thickness of 75 microns (Laminate A). The films were laminated together at 60° C. at a speed of 1.5 meters per minute on a ChemInstruments hot roll laminator (Model HL-100). A control sample (laminate B) was also produced with the same films in an identical configuration but using a conventional two-component water-based adhesive obtained from Dow Chemical Company (ROBOND™ L330 with 2% isocyanate co-catalyst). These films were also laminated at 60° C. at a speed of 1.5 meters per minute.

The laminates were then tested for bond strength using the method described in ASTM F-88, and the results are shown below in Table 1.

TABLE 1

Bond Strength of Laminates

| Ink Coverage | Laminate A Bond Strength (N/inch) | Laminate B Bond Strength (N/inch) |
| --- | --- | --- |
| 100% magenta; 100% black | 2.8 | 1.6 |
| 100% magenta | 5.0 | 1.4 |
| 100% cyan; 100% magenta | 3.2 | 1.5 |
| 100% cyan | 4.6 | 1.5 |
| 100% yellow; 100% cyan | 4.6 | 1.4 |
| 100% yellow | 7.8 | 1.9 |

As can be seen, the laminate samples formed in accordance with embodiments of the invention exhibited higher bond strength for all samples printed with various ink colors.

The laminates were also tested for ink transfer failure upon deconstruction of the laminate, and the results are shown in Table 2 below. The designation "NT" indicates no ink was transferred from the printed web to the sealant web upon deconstruction of the laminate or that there was a lack of adhesion of ink to the adhesive and/or a lack of adhesion of the adhesive to the sealant film and/or a cohesive failure of the adhesive layer. The designation "PT" indicates a partial transfer of ink from the printed substrate to the sealant substrate upon laminate deconstruction. "FT" indicates full transfer of ink from the printed substrate to the sealant substrate when the laminate is deconstructed or that bond strength of the adhesive to the ink is greater than the bond strength of the ink to the print web. IS indicates that the ink split or that there was a cohesive failure of the ink layer. IT indicates ink transfer, meaning a portion of the ink transferred from the primary substrate that it was printed upon to the secondary substrate, of which was laminated to the primary printed substrate.

TABLE 2

Ink Transfer Failure Upon Deconstruction of Laminates

| Ink Coverage | Laminate A Failure | Laminate B Failure |
| --- | --- | --- |
| 100% magenta; 100% black | IS | 50% PT |
| 100% magenta | IS | NT |
| 100% cyan; 100% magenta | IS | 5% PT |
| 100% cyan | 5% PT | NT |
| 100% yellow; 100% cyan | IS | NT |
| 100% yellow | BOPET tear | NT |

As can be seen, the laminate including a thermal lamination adhesive in accordance with an embodiment of the invention exhibited greater overall adhesion of the ink/adhesive layer than a conventional lamination adhesive. As shown, in at least one sample, the bond strength was such that the BOPET film tore upon deconstruction of the laminate.

Example 2

A biaxially oriented polyethylene terephthalate (BOPET) film having a thickness of 12 microns was printed and then coated with a thermal lamination adhesive in accordance with an embodiment of the invention at a coat weight of 3.0 dry gsm on a commercial scale Digilam water based coating/lamination unit manufactured by ABG. The ink surface of the printed film was corona treated to a dyne level of 46. It was then coated with the thermal lamination adhesive via a direct gravure coating system using an anilox roll of 160 lines/cm and 14.8 ml/m². A smoothing bar rotating in the direction opposite of the process direction at 105% of the line speed was used to smooth the applied coating. The lamination adhesive included 48% by weight polyamide, 21% by weight ethylene acrylic acid copolymer, 29% by weight polyurethane, and 2% by weight isocyanate cross-linker. The coated film was then dried in for successive ovens set at 100, 87, 54 and 32° C. respectively. The printed and coated film web was then thermally laminated to a blown low linear density polyethylene (LLDPE) film having a thickness of 75 microns (Laminate A). The films were laminated together in an oven at 100° C. for 1 minute at a speed of 33 meters per minute. A control sample (laminate B) was also produced with the same films in an identical configuration but using a conventional two-component water-based adhesive obtained from Dow Chemical Company (ROBOND™ L330 with 2% isocyanate co-catalyst). These films were also laminated at 100° C. at a speed of 33 meters per minute.

The films were then tested for bond strength using the method described in ASTM F-88, and the results are shown below in Table 3.

TABLE 3

Bond Strength of Laminates

| Ink Coverage | Laminate A Bond Strength (N/inch) | Laminate B Bond Strength (N/inch) |
| --- | --- | --- |
| 100% magenta; 100% black | 5.0 | 3.9 |
| 100% magenta | 4.9 | 3.9 |
| 100% cyan; 100% magenta | 4.5 | 4.0 |
| 100% cyan | 5.4 | 5.6 |
| 100% yellow; 100% cyan | 5.0 | 4.9 |
| 100% yellow | 5.9 | 5.7 |

As can be seen, the laminate samples formed in accordance with embodiments of the invention exhibited higher bond strength in half of the samples tested. In those other samples where the bond strength of Laminate A was not significantly higher than Laminate B, the results are comparable and within experimental error.

The laminates were also tested for ink transfer failure upon deconstruction of the laminate, and the results are shown in Table 4 below. "IS" indicates that the ink split or that there was a cohesive failure of the ink layer. In the case of all samples tested, the lamination failed via ink split.

TABLE 4

Ink Transfer Failure Upon Deconstruction of Laminates

| Ink Coverage | Laminate A Failure | Laminate B Failure |
| --- | --- | --- |
| 100% magenta; 100% black | IS | IS |
| 100% magenta | IS | IS |
| 100% cyan; 100% magenta | IS | IS |
| 100% cyan | IS | IS |
| 100% yellow; 100% cyan | IS | IS |
| 100% yellow | IS | IS |

As can be seen, the laminate including a thermal lamination adhesive in accordance with an embodiment of the invention exhibited greater overall adhesion of the ink/adhesive layer than a conventional lamination adhesive.

Example 3

A biaxially oriented polyethylene terephthalate (BOPET) film having a thickness of 12 microns was reverse printed with HP-Indigo inks with a commercial packaging print file. The surface of the ink was corona treated to a dyne level of 44. The corona treated printed BOPET was then laminated to a 75 micron linear low density polyethylene (LLDPE) sealant film using a commercial scale Laminadora water based thermal laminator. The lamination adhesive included 48% by weight polyamide, 21% by weight ethylene acrylic acid copolymer, 29% by weight polyurethane, and 2% by weight isocyanate crosslinker. The anilox roll used to apply the coating was 170 lines/inch and 10.0 BCM/square inch. A dry coat weight of 0.8 dry grams per square meter (gsm) was applied. The coating was dried in a 3 meter long oven at 90° C. The lamination was produced at a line speed of 7 meters/minute.

The laminated film structure was then tested for bond strength using the method described in ASTM F-88 immediately after lamination. In areas where no ink was present, the lamination failed immediately via tearing of the BOPET film, which demonstrates the highest bond strength obtainable. In areas where ink was present, the lamination bond strength measured 4.0 Newtons per inch, with the failure mechanism being a cohesive failure of the ink. This bond strength exceeded the industry standard of 3.5 Newtons per inch necessary for immediate slitting and conversion into pouches.

Having described the invention in detail and by reference to preferred embodiments thereof, it will be apparent that modifications and variations are possible without departing from the scope of the claimed subject matter. Thus it is intended that the specification cover the modifications and variations of the various embodiments described herein provided such modifications and variations come within the scope of the appended claims and their equivalents.

What is claimed is:

1. A lamination adhesive comprising:
    an aqueous dispersion comprising a mixture of polyamide and a copolymer of ethylene and acrylic acid; and
    an isocyanate crosslinker
    wherein the lamination adhesive is substantially free of non-aqueous plasticizers and organic solvents.

2. The lamination adhesive of claim 1, wherein the aqueous dispersion comprises from about 25% to about 70% by weight polyamide and from about 10% to about 30% by weight ethylene acrylic acid copolymer.

3. The lamination adhesive of claim 1, wherein the aqueous dispersion comprises from about 25% to about 70% by weight polyamide.

4. The lamination adhesive of claim 1, wherein the aqueous dispersion comprises from about 10% to about 30% by weight ethylene acrylic acid copolymer.

5. The lamination adhesive of claim 1, wherein the aqueous dispersion further comprises polyurethane.

6. The lamination adhesive of claim 5, wherein the aqueous dispersion comprises:
    from about 25% to about 70% by weight polyamide;
    from above 0% to about 70% by weight polyurethane; and
    from about 10% to about 30% by weight ethylene acrylic acid copolymer.

7. The lamination adhesive of claim 1, wherein the aqueous dispersion further comprises ammonia.

8. The lamination adhesive of claim 1, wherein the solids comprise from about 1% to about 2% by weight isocyanate crosslinker.

9. The lamination adhesive of claim 1, wherein the dispersion comprises from about 5% to about 40% by weight solids and from about 60% to about 95% weight water.

10. The lamination adhesive of claim 1, wherein the copolymer of ethylene and acrylic acid comprises from about 65% to about 90% ethylene comonomers and from about 10% to about 35% acrylic acid comonomers.

11. The lamination adhesive of claim 1, wherein the polyamide is an amine-terminated polyamide.

12. The lamination adhesive of claim 1, wherein the lamination adhesive has a Brookfield dispersion viscosity of less than about 200 cps.

13. A lamination adhesive comprising:
    an aqueous dispersion comprising:
        from about 25% to about 70% by weight of a polyamide;
        from about 10% to about 30% by weight of a copolymer of ethylene and acrylic acid; and
        from about 0% to about 70% by weight polyurethane;
    wherein the lamination adhesive is substantially free of non-aqueous plasticizers and organic solvents.

14. The lamination adhesive of claim 13, wherein the aqueous dispersion further comprises ammonia.

15. The lamination adhesive of claim 13, wherein the dispersion comprises from about 5% to about 40% by weight solids and from about 60% to about 95% weight water.

16. The lamination adhesive of claim 13, wherein the copolymer of ethylene and acrylic acid comprises from about 65% to about 90% ethylene comonomers and from about 10% to about 35% acrylic acid comonomers.

17. The lamination adhesive of claim 13, wherein the polyamide is an amine-terminated polyamide.

18. The lamination adhesive of claim 13, wherein the lamination adhesive has a Brookfield dispersion viscosity of less than about 200 cps.

19. A lamination adhesive comprising an aqueous dispersion comprising a mixture of polyamide and a copolymer of ethylene and acrylic acid; wherein the lamination adhesive:
    is substantially free of non-aqueous plasticizers and organic solvents; and
    has a Brookfield dispersion viscosity of less than about 200 cps.

20. The lamination adhesive of claim 19, wherein the aqueous dispersion comprises from about 25% to about 70% by weight polyamide and from about 10% to about 30% by weight ethylene acrylic acid copolymer.

21. The lamination adhesive of claim 19, wherein the aqueous dispersion comprises from about 25% to about 70% by weight polyamide.

22. The lamination adhesive of claim 19, wherein the aqueous dispersion comprises from about 10% to about 30% by weight ethylene acrylic acid copolymer.

23. The lamination adhesive of claim 19, wherein the aqueous dispersion further comprises polyurethane.

24. The lamination adhesive of claim 19, wherein the aqueous dispersion further comprises ammonia.

25. The lamination adhesive of claim 19, wherein the dispersion comprises from about 5% to about 40% by weight solids and from about 60% to about 95% weight water.

26. The lamination adhesive of claim 19, wherein the copolymer of ethylene and acrylic acid comprises from about 65% to about 90% ethylene comonomers and from about 10% to about 35% acrylic acid comonomers.

27. The lamination adhesive of claim 19, wherein the polyamide is an amine-terminated polyamide.

* * * * *